United States Patent
Endo

(10) Patent No.: US 10,692,369 B2
(45) Date of Patent: Jun. 23, 2020

(54) SERVER AND INFORMATION PROVIDING DEVICE

(71) Applicant: TOYOTA JIDOSHA KABUSHIKI KAISHA, Toyota-shi, Aichi-ken (JP)

(72) Inventor: Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 15/470,085

(22) Filed: Mar. 27, 2017

(65) Prior Publication Data

US 2017/0301235 A1 Oct. 19, 2017

(30) Foreign Application Priority Data

Apr. 14, 2016 (JP) ................. 2016-081505

(51) Int. Cl.
*G08G 1/0967* (2006.01)
*G06N 20/00* (2019.01)
(Continued)

(52) U.S. Cl.
CPC ....... *G08G 1/096708* (2013.01); *B60W 40/09* (2013.01); *G01C 21/3453* (2013.01); *G05D 1/0088* (2013.01); *G06K 9/00791* (2013.01); *G06K 9/3258* (2013.01); *G06N 20/00* (2019.01); *G08G 1/012* (2013.01); *G08G 1/0112* (2013.01);
(Continued)

(58) Field of Classification Search
CPC ........... B60W 2040/046; B60W 40/09; B60W 2050/046; G08G 1/096708; G08G 1/164; G08G 1/096725; G08G 1/096716; G08G 1/04; G08G 1/0141; G08G 1/0129; G08G 1/166; G08G 1/096775; G08G 1/0112; G08G 1/012; G08G 1/09675; G06N 20/00;
(Continued)

(56) References Cited

U.S. PATENT DOCUMENTS 9,688,288 B1 * 6/2017 Lathrop ............... B60W 50/14
10,156,848 B1 * 12/2018 Konrardy ............... B60R 25/04
(Continued)

FOREIGN PATENT DOCUMENTS

CN 102067052 A 5/2011
DE 60220232 T2 12/2007
(Continued)

OTHER PUBLICATIONS

Paden, B., et al., "A Survey of Motion Planning and Control Techniques for Self-Driving Urban Vehicles," IEEE Transactions on Intelligent Vehicles, vol. 1, No. 1, pp. 33-55, Mar. 2016.

*Primary Examiner* — Genna M Mott
(74) *Attorney, Agent, or Firm* — Oliff PLC

(57) ABSTRACT

A server includes a support aspect obtaining unit configured to obtain, from each of a plurality of vehicles by communication, a support aspect of driving support executed by a driving support device of the vehicle on each of a plurality of road links; a road link information generation unit configured to generate road link information in which the support aspect is associated with data of the road link for each of the road links; and an information providing unit configured to provide the road link information generated by the road link information generation unit, to an information service destination.

8 Claims, 12 Drawing Sheets

(51) Int. Cl.
- *G08G 1/16* (2006.01)
- *G08G 1/04* (2006.01)
- *G08G 1/01* (2006.01)
- *G01C 21/34* (2006.01)
- *B60W 40/09* (2012.01)
- *G05D 1/00* (2006.01)
- *G06K 9/00* (2006.01)
- *G06K 9/32* (2006.01)
- *B60W 50/04* (2006.01)

(52) U.S. Cl.
CPC ......... *G08G 1/0129* (2013.01); *G08G 1/0141* (2013.01); *G08G 1/04* (2013.01); *G08G 1/09675* (2013.01); *G08G 1/096716* (2013.01); *G08G 1/096725* (2013.01); *G08G 1/096775* (2013.01); *G08G 1/164* (2013.01); *G08G 1/166* (2013.01); *B60W 2050/046* (2013.01)

(58) Field of Classification Search
CPC . G05D 1/0088; G06K 9/3258; G06K 9/00791
See application file for complete search history.

(56) References Cited

U.S. PATENT DOCUMENTS

| | | |
|---|---|---|
| 2003/0088344 A1 | 5/2003 | Oda et al. |
| 2008/0091339 A1 | 4/2008 | Nagase et al. |
| 2011/0118939 A1 | 5/2011 | Kawamata et al. |
| 2014/0156182 A1 | 6/2014 | Nemec et al. |
| 2015/0211868 A1 | 7/2015 | Matsushita et al. |
| 2015/0217763 A1 | 8/2015 | Reichel et al. |
| 2016/0293000 A1* | 10/2016 | Torgerson ............ G08G 1/0112 |
| 2016/0305787 A1 | 10/2016 | Sato et al. |
| 2017/0197635 A1 | 7/2017 | Sato |
| 2018/0113474 A1* | 4/2018 | Koda ...................... G08G 1/09 |

FOREIGN PATENT DOCUMENTS

| | | |
|---|---|---|
| DE | 102012016802 A1 | 2/2014 |
| DE | 102014209725 A1 | 11/2015 |
| DE | 102014008151 A1 | 12/2015 |
| DE | 102015205131 A1 | 9/2016 |
| JP | 2005-209073 A | 8/2005 |
| JP | 2008-097345 A | 4/2008 |
| JP | 2014-149225 A | 8/2014 |
| JP | 2015-072651 A | 4/2015 |
| JP | 2015-141050 A | 8/2015 |
| JP | 2016-050900 A | 4/2016 |
| WO | 2014/013985 A1 | 1/2014 |
| WO | 2014/139821 A1 | 9/2014 |

* cited by examiner

FIG.3

| LEVELS OF VEHICLE AUTOMATION BY NHTSA |
|---|
| LEVEL 0 (NO AUTOMATION): THE DRIVER CONTROLS DRIVING (STEERING, BRAKING, AND ACCELERATION) AT ALL TIMES. |
| LEVEL 1 (AUTOMATION OF SPECIFIC FUNCTIONS): STEERING, BRAKING, OR ACCELERATION IS SUPPORTED, BUT NOT ALL OF STEERING, BRAKING, AND ACCELERATION ARE SUPPORTED. |
| LEVEL 2 (AUTOMATION OF COMBINED FUNCTIONS): THE DRIVER IS RESPONSIBLE FOR SAFE DRIVING, THOUGH ALL OF STEERING, BRAKING, AND ACCELERATION ARE SUPPORTED. |
| LEVEL 3 (SEMI AUTOMATIC DRIVING): THE DRIVER PERFORMS DRIVING OPERATIONS BY HIMSELF ONLY WHEN THE SITUATION GOES BEYOND THE FUNCTIONAL LIMIT. |
| LEVEL 4 (FULLY AUTOMATIC DRIVING): THE DRIVER ENTRUSTS ALL DRIVING OPERATIONS AND MONITORING ROADWAY CONDITIONS, TO THE SYSTEM. |

FIG.4

| | LEVEL 0 | LEVEL 1 | LEVEL 2 | LEVEL 3 | LEVEL 4 |
|---|---|---|---|---|---|
| | — | SAFETY WARNING | SAFETY WARNING | SAFETY WARNING | SAFETY WARNING |
| | — | — | AUTOMATIC DECELERATION, AUTOMATIC AVOIDANCE | AUTOMATIC DECELERATION, AUTOMATIC AVOIDANCE | AUTOMATIC DECELERATION, AUTOMATIC AVOIDANCE |
| | — | — | — | AUTOMATIC ACCELERATION | AUTOMATIC ACCELERATION |
| | — | — | — | — | AUTOMATIC STEERING |

FIG.8

VEHICLE ID = C1

| ROAD LINK ID | DRIVING SUPPORT FUNCTION | DRIVING SUPPORT LEVEL | ACTIVATION POSITION | ACTIVATION TIME | ACTIVATION DISTANCE | ACTIVATION ENVIRONMENT |
|---|---|---|---|---|---|---|
| LK1 | ACC | LEVEL 3 | p1 | t11 | d11 | e11 |
| LK2 | ACC | LEVEL 4 | p2 | t12 | d12 | e12 |
| LK3 | RSA | LEVEL 4 | p3 | t13 | d13 | e13 |
| ... | ... | ... | ... | ... | ... | ... |

EXECUTED SUPPORT ASPECTS

VEHICLE ID = C2

| LK2 | ACC | LEVEL 3 | p2 | t21 | d21 | e21 |
| LK3 | LKA | LEVEL 4 | p3 | t22 | d22 | e22 |
| LK4 | RSA | LEVEL 4 | p4 | t23 | d23 | e23 |
| ... | ... | ... | ... | ... | ... | ... |

EXECUTED SUPPORT ASPECTS

VEHICLE ID = C3

| ... | ... | ... | ... | ... | ... | ... |

EXECUTED SUPPORT ASPECTS

| ROAD LINK INFOR-MATION | ROAD LINK ID | LENGTH | POSI-TION | WIDTH | ROAD TYPE | DRIVING SUPPORT FUNCTION | DRIVING SUPPORT LEVEL | ACTI-VATION POSITION | ACTI-VATION TIME | ACTI-VATION DISTANCE | ACTI-VATION ENVIRON-MENT |
|---|---|---|---|---|---|---|---|---|---|---|---|
| | LK1 | | | | | | | | | | |
| | LK2 | | | | | | | | | | |
| | LK3 | | | | | | | | | | |
| | LK4 | | | | | | | | | | |
| | ... | | | | | | | | | | |

ROAD LINK DATA

EXECUTABLE DRIVING SUPPORT ASPECTS (302)

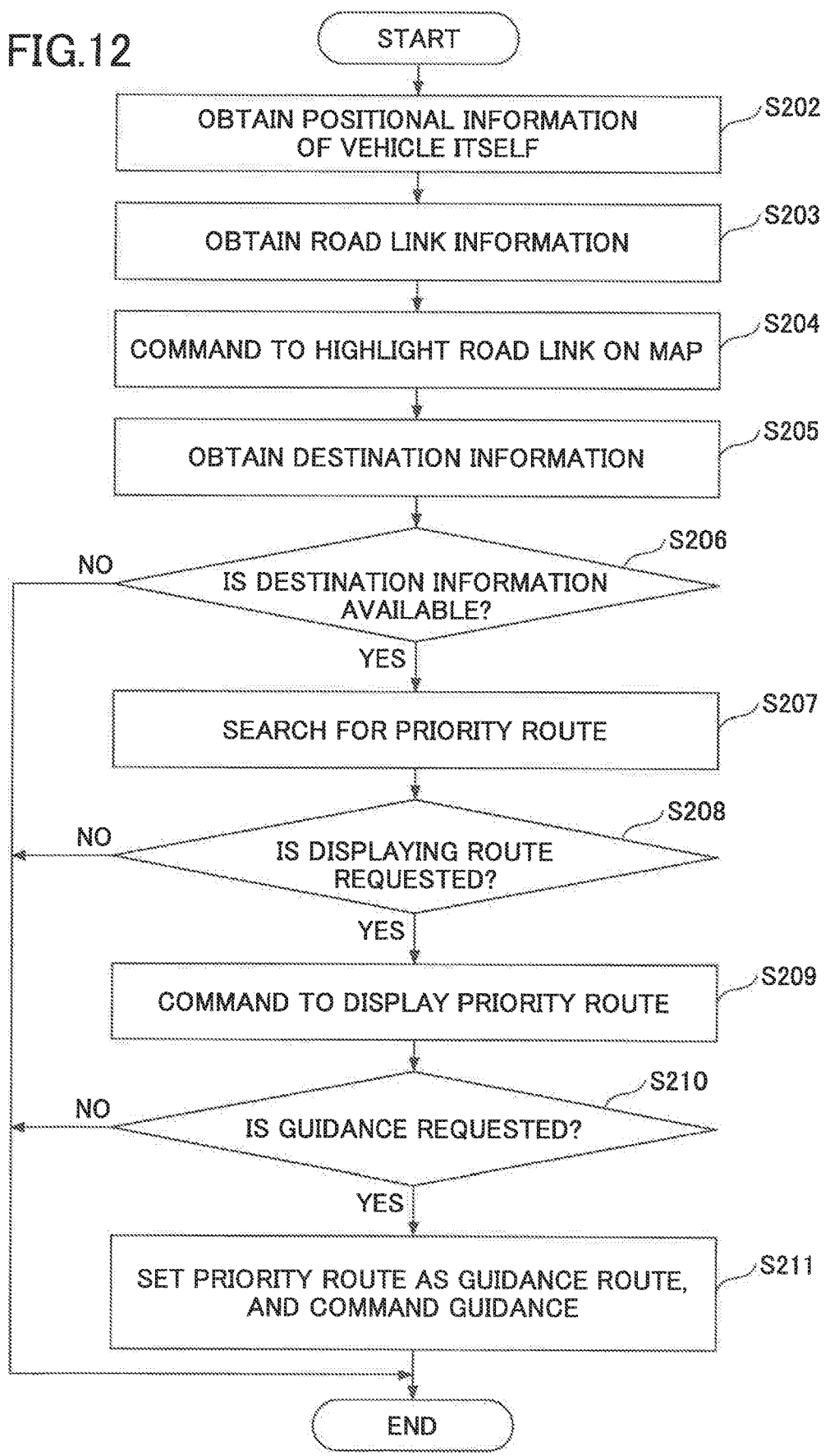

SERVER AND INFORMATION PROVIDING DEVICE

CROSS-REFERENCE TO RELATED APPLICATIONS

This application is based upon and claims the benefit of priority of the prior Japanese Priority Application No. 2016-081505 filed on Apr. 14, 2016, the entire contents of which are hereby incorporated by reference.

FIELD

The present disclosure relates to a server and an information providing device.

BACKGROUND

Conventionally, a driving support system has been know that executes driving support taking individual differences of drivers and situations into account, to be more finely adaptive to the drivers (see, for example, Patent document 1). This driving support system grasps the driving situation based on monitoring operations of the driver, detecting the external environment of the vehicle, and the like, to execute the driving support adaptive to the driver.

Also, a technology has been known that searches for a route having a minimum total cost of road links to a destination, based on the road link data (see, for example, Patent document 2).

RELATED-ART DOCUMENTS

Patent Documents

[Patent Document 1] Japanese Laid-Open Patent Application No. 2005-209073
[Patent Document 2] Japanese Laid-Open Patent Application No. 2014-149225

In recent years, introduction of driving support such as automatic driving has been advancing. However, depending on maintenance states of roads and the like, there may be cases where the driving support can be executed on some roads, but cannot be executed on other roads. For example, on a road where traffic lanes such as white lines have disappeared, it is difficult to activate a driving support function to make the vehicle travel along a traffic lane in a normal way. Also, there may be road on which the driving support is executable in a specific support aspect, but not in the other support aspects. For example, there may be a road on which the driving support function to make the vehicle travel along the traffic lanes can be executed normally, but the other driving support functions cannot be executed.

However, it has been difficult for the conventional technologies to properly grasp which one of the support aspects of the driving support is executable on which one of the roads.

Thereupon, it is an object of an aspect of the present invention to provide a server and an information providing device that can properly grasp which one of the support aspects of the driving support is executable on which one of the roads.

SUMMARY

In order to achieve the above-mentioned object, in a first aspect of the present invention, a server includes a support aspect obtaining unit configured to obtain, from each of a plurality of vehicles by communication, a support aspect of driving support executed by a driving support device of the vehicle on each of a plurality of road links; a road link information generation unit configured to generate road link information in which the support aspect is associated with data of the road link for each of the road links; and an information providing unit configured to provide the road link information generated by the road link information generation unit, to an information service destination.

According to the first aspect, the support aspect obtaining unit obtains the support aspect of the driving support executed by the driving support device of each of the vehicles for each of the road links, from each of the vehicles by communication. The information providing unit provides the road link information in which the support aspect is associated with data of the road link for each of the road links to the information service destination. Therefore, since the road link information in which the support aspect of the driving support executed by the driving support device is associated with the data of the road link, is provided to the information service destination, the information service destination can properly grasp which one of the support aspects of the driving support is executable on which one of the roads.

In a second aspect of the present invention, a server includes a support aspect obtaining unit configured to obtain, from each of a plurality of vehicles by communication, a support aspect of driving support executed by a driving support device of the vehicle on each of a plurality of road links; a road link information generation unit configured to generate road link information in which the support aspect is associated with data of the road link for each of the road links; a route search unit configured to search for a route passing through the road links on which the driving support is executable in the support aspects, based on the road link information generated by the road link information generation unit; and an information providing unit configured to provide the route that the route search unit has searched for, to an information service destination.

According to the second aspect, the support aspect obtaining unit obtains, from each of the vehicles by communication, a support aspect of driving support executed by a driving support device of each of a plurality of vehicles on each of a plurality of road links. The route search unit searches for a route passing through the road links on which the driving support is executable in the support aspects, based on the road link information in which the support aspect is associated with the data of the road link for each of the road links. The information providing unit provides the route that the route search unit has searched for to the information service destination. Therefore, since the route passing through the road links on which the driving support is executable in the support aspects, is provided to the information service destination, the information service destination can properly grasp which one of the support aspects of the driving support is executable on which one of the roads.

In a third aspect of the present invention based on the second aspect, the support aspect includes a plurality of driving support levels representing respective support degrees of the driving support; and the route search unit prioritizes searching for a route passing through the road links on which the driving support is executable at a second driving support level higher than a first driving support level, over searching for a route passing through the road links on which the driving support is executable at the first driving support level.

According to the third aspect, it is possible to provide information to the information service destination, with prioritizing a route passing through the road links on which the driving support is executable at a comparatively high driving support level, over a route passing through the road links on which the driving support is executable at a comparatively low driving support level.

In a fourth aspect of the present invention based on the second or third aspect, the server further includes a specification obtaining unit configure to obtain a specification of the driving support that can be executed by the information service destination, and the route search unit searches for a route passing through the road links on which the driving support can be executed based on the specification obtained by the specification obtaining unit.

The types of executable driving support vary depending on the type or model year of a vehicle that can execute driving support, or the specification of software implementing the driving support, such as the version and the like. Therefore, according to the fourth aspect, it is possible to provide information about a route suitable for the specification of the driving support that can be executed by the information service destination, to the information service destination.

In a fifth aspect of the present invention based on the first to fourth aspects, in a case where one of the road links includes a plurality of sections on which different support aspects of the driving support are to be executed, the road link information generation unit generates the road link information in which the support aspect is associated with the data of the road link for each of the different sections.

According to the fifth aspect, even if one of the road links includes sections on which different support aspects of the driving support are to be executed, it is possible to provide information about what types of the support aspects of the driving support can be executed on the respective sections, to the information service destination.

For example, consider a case in which one of the road links is divided into a first section on which the driving support has been executed in a first support aspect, and a second section on which the driving support has been executed in a second support aspect different from the first support aspect. In this case, the road link information generation unit can generate first road link information in which the first support aspect is associated with data of the first section of the road link, and can generate second road link information in which the second support aspect is associated with data of the second section of the road link. Therefore, even if the road link includes the sections on which the different support aspects of the driving support have been executed, it is possible to provide information about what types of the support aspects of the driving support can be executed on the respective sections, to the information service destination.

In a sixth aspect of the present invention based on the first to fourth aspects, the server further includes a support aspect identifying unit configured to identify the support aspect of the driving support that can be executed for each of the road links, based on the support aspects obtained by the support aspect obtaining unit from each of the vehicles. The road link information generation unit generates the road link information in which the support aspect identified by the support aspect identifying unit is associated with the data of each of the road links.

According to the sixth aspect, the support aspect identifying unit identifies the support aspect of the driving support executable on each of the road links, based on the support aspect of the driving support executed by the driving support device of each of the vehicles for each of the road links. The information providing unit provides the road link information in which the support aspect identified by the support aspect identifying unit is associated with the data of the road link for each of the road links, to the information service destination. Therefore, since the road link information in which the support aspect of the driving support that can be executed by the driving support device is associated with the data of the road link, is provided to the information service destination, the information service destination can properly grasp which one of the support aspects of the driving support is executable on which one of the roads.

In a seventh aspect of the present invention based on the sixth aspect, in a case where one of the road links includes a plurality of sections on which different support aspects of the driving support are to be executed, the support aspect identifying unit identifies the support aspect of the driving support executable on each of the different sections. The road link information generation unit generates the road link information in which the support aspect identified by the support aspect identifying unit is associated with the data of each of the different sections.

According to the seventh aspect, even if one of the road links includes sections on which different support aspects of the driving support are to be executed, it is possible to provide information about what types of the support aspects of the driving support can be executed on the respective sections, to the information service destination.

For example, consider a case in which one of the road links is divided into a first section on which the driving support has been executed in a first support aspect, and a second section on which the driving support has been executed in a second support aspect different from the first support aspect. In this case, the support aspect identifying unit can identify, for example, the support aspect of the driving support executable on the first section as the first support aspect, and can identify the support aspect of the driving support executable on the second section as the second support aspect. Thereby, the road link information generation unit can generate the first road link information in which the first support aspect is associated with data of the first section of the road link, and can generate the second road link information in which the second support aspect is associated with data of the second section of the road link. Therefore, even if the road link includes the sections on which the different support aspects of the driving support have been executed, it is possible to provide information about what types of the support aspects of the driving support can be executed on the respective sections, to the information service destination.

In an eighth aspect of the present invention, an information providing device includes a display unit; an information obtaining unit configured to obtain, from a server by communication, road link information in which a support aspect of driving support that can be executed is associated with data of a road link for each of the road links; and a display control unit configured to control a display aspect of the road link to be displayed on the display unit, based on the road link information obtained by the information obtaining unit from the server. The display control unit sets the display aspect to a different aspect depending on the support aspect.

According to the eighth aspect, the display control unit controls the display aspect of the road link to be displayed on the display unit, based on the road link information in which the support aspect of the executable driving support is associated with the data of the road link for each of the road links. The display control unit sets the display aspect to a different aspect depending on the support aspect. Thereby, the display aspect of the road link to be displayed on the display unit changes depending on the support aspect of the executable driving support. Therefore, it is possible to visually provide information for the user about which one of the support aspects of the driving support is executable on which one of the roads, and the user can visually recognize differences of the support aspects of the driving support among the road links easily and properly.

In a ninth aspect of the present invention based on the eighth aspect, the information providing device further includes a route search unit configured to search for a route passing through the road links on which the driving support is executable in the support aspects, based on the road link information obtained by the information obtaining unit from the server. The display control unit displays the route that the route search unit has searched for on the display unit.

According to the ninth aspect, since a route passing through the road links on which the driving support is executable in the support aspects that have been obtained from the server as the executable support aspects of the driving support, is displayed on the display unit, it is possible to visually provide information about which one of the support aspects of the driving support is executable on which one of the roads, by displaying the route for the user.

In a tenth aspect of the present invention based on the eighth or the ninth aspect, the support aspect includes a plurality of driving support levels representing respective support degrees of the driving support. The display control unit highlights the road link on which the driving support is executable at a first driving support level on the display unit, in contrast to the road link on which the driving support is executable at a second driving support level lower than the first driving support level.

According to the tenth aspect, since displaying the road link on which the driving support is executable at a comparatively high driving support level is highlighted in contrast to displaying the road link on which the driving support is executable at a comparatively low driving support level, the user can visually recognize the road link on which the driving support is executable at the comparatively high driving support level easily.

In an eleventh aspect of the present invention based on the ninth aspect, the support aspect includes a plurality of driving support levels representing respective support degrees of the driving support. The route search unit prioritizes searching for a route passing through the road links on which the driving support is executable at a second driving support level higher than a first driving support level, over searching for a route passing through the road links on which the driving support is executable at the first driving support level.

According to the eleventh aspect, is possible to provide information for the user, with prioritizing a route passing through the road links on which the driving support is executable at a comparatively high driving support level, over a route passing through the road links on which the driving support is executable at a comparatively low driving support level.

According to one aspect of the present invention, it is possible to properly grasp which one of the support aspects of the driving support is executable on which one of the roads.

BRIEF DESCRIPTION OF DRAWINGS

FIG. 3 is a diagram illustrating an example of driving support levels of a drive support device;

FIG. 4 is a diagram illustrating another example of driving support levels of a drive support device;

FIG. 8 is a diagram illustrating an example of support aspects executed on respective road links stored in a support aspect storage unit;

FIG. 9 is a diagram illustrating an example of road link information of road links stored in a road link information storage unit;

FIG. 12 is a flowchart illustrating an example of operations of an information providing device.

DESCRIPTION OF EMBODIMENTS

In the following, embodiments will be described with reference to the drawings.

Figure 1:
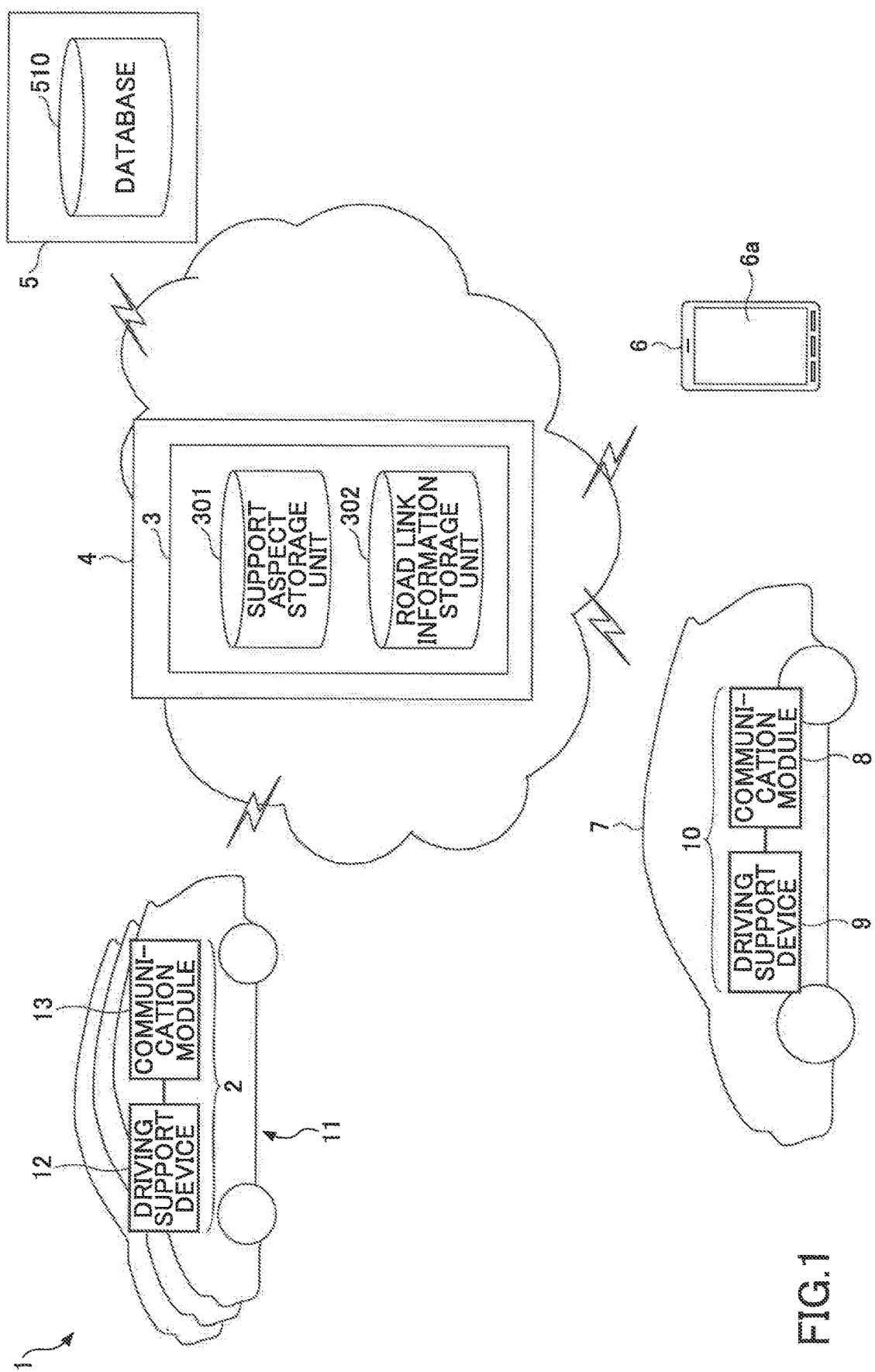
FIG. 1 is a diagram schematically illustrating an example of a configuration of an information providing system.

FIG. 1 is a diagram schematically illustrating an example of a configuration of an information providing system 1. The information providing system 1 is an example of a system that receives information transmitted from each of multiple vehicles, and transmits the information to be provided to an information service destination. The information providing system 1 provides predetermined information to the information service destination such as an information-provision-destination vehicle 7. The information providing system 1 includes, for example, a vehicle 11, a server 3, the information-provision-destination vehicle 7, an information providing terminal 6, and an information service destination server 5.

The vehicle 11 has an in-vehicle control device 2 installed. It is assumed that the in-vehicle control device 2 is installed in every vehicle 11 relating to this system. In the following, unless otherwise specified, the in-vehicle control device 2 is installed in an arbitrary one of the vehicles 11. The vehicle 11 is a subject for collection of probe information such as driving support aspects and the like executed on the vehicle 11. Note that the vehicle 11 may be an example of the information service destination that receives information provided by the server 3.

The in-vehicle control device 2 includes, for example, a communication module 13 and a driving support device 12. The communication module 13 is a device to make a connection to the server 3 by using at least one of a wireless communication channel and a wired communication channel. The communication module 13 may use a modem function and a tethering function of a portable terminal such as a smartphone. The driving support device 12 executes driving support of the vehicle 11.

The server 3 is arranged in a center 4. The center 4 is a facility that is located in a remote place away from the vehicle 11, the information-provision-destination vehicle 7, the information providing terminal 6, and the information service destination server 5. The server 3 can be connected to the in-vehicle control device 2, the information-provision-destination vehicle 7, and the information providing terminal 6, by using at least one of a wireless communication channel and a wired communication channel. The server 3 can be connected to the information service destination server 5 by using at least one of a wireless communication channel and a wired communication channel, The server 3 includes a support aspect storage unit 301 and a road link information storage unit 302. The support aspect storage unit 301 is a database to accumulate support aspects obtained from each vehicle 11 (the support aspects of the driving support executed by the driving support device of each of the vehicles 11 on each of the road links). The road link information storage unit 302 is a database to accumulate road link information of each of the road links.

The information-provision-destination vehicle 7 is an example of the information service destination to receive information provided by the server 3. The information-provision-destination vehicle 7 has an in-vehicle control device 10 installed. It is assumed that the in-vehicle control device 10 is installed in each of the information-provision-destination vehicles 7. In the following, unless otherwise specified, the in-vehicle control device 10 will be described that is installed in an arbitrary one of the vehicles 11.

The in-vehicle control device 10 includes, for example, a communication module 8 and a driving support device 9. The communication module 8 is a device to make a connection to the server 3 by using at least one of a wireless communication channel and a wired communication channel. The communication module 8 may use a modem function and a tethering function of a portable terminal such as a smartphone. A driving support device 9 executes the driving support for the information-provision-destination vehicle 7.

The information providing terminal 6 is an example of an information service destination that receives information provided by the server 3, and is a device to make a connection to the server 3 by using at least one of a wireless communication channel and a wired communication channel. The information providing terminal 6 includes a display 6a that can display information from the server 3 if the user has been authenticated. Specific examples of the information providing terminal 6 include a smartphone and a tablet terminal.

The information service destination server 5 is an example of the information service destination that receives information provided by the server 3, and is a device to make a connection to the server 3 by using at least one of a wireless communication channel and a wired communication channel. The information service destination server 5 includes a database 510. The database 510 accumulates information provided by the server 3.

The information service destination server 5 is deployed in, for example, a corporation that provides services using the information provided by the server 3 (e.g., an insurance company) or its outsourcing agent. The insurance company uses the information provided by the server 3 (the road link information in which support aspects are associated with data of a road link for each of the road links) to calculate the premium for a driver.

Figure 2:
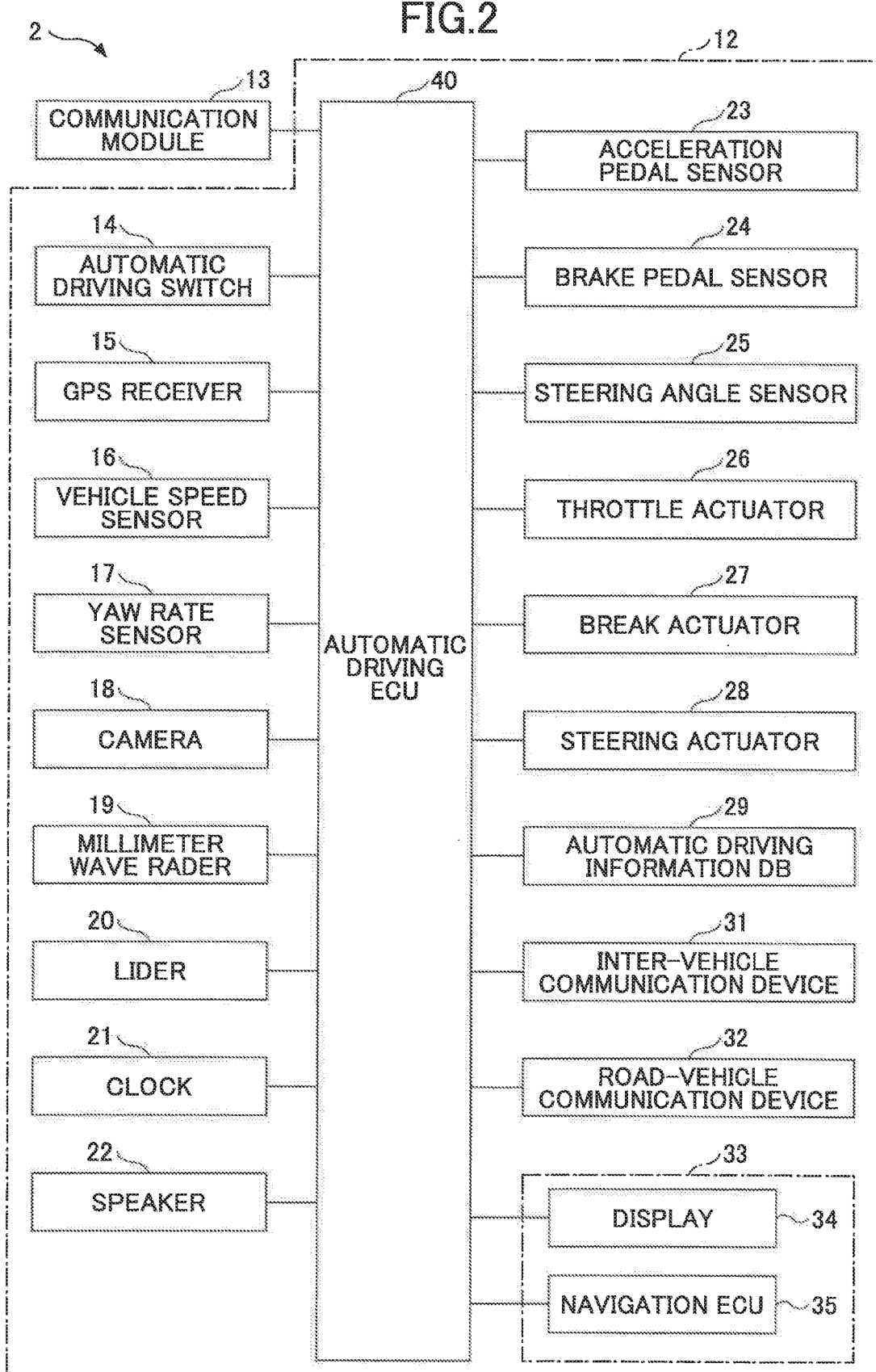
FIG. 2 is a diagram schematically illustrating an example of a hardware configuration of an in-vehicle control device.

FIG. 2 is a diagram schematically illustrating an example of a hardware configuration of the in-vehicle control device 2. The in-vehicle control device 2 includes a communication module 13 and a drive support device 12.

The communication module 13 is an example of a communicator to connect an automatic driving ECU 40 of the driving support device 12 with the server 3 of the center 4 via at least one of a wireless communication channel and a wired communication channel. The communication module 13 may be a transceiver that can execute wireless communication by using, for example, a wireless communication channel for cellular phones.

The drive support device 12 executes drive support for the vehicle. The driving support device 12 includes an automatic driving switch 14, a GPS receiver 15, a vehicle speed sensor 16, a yaw rate sensor 17, a camera 18, a millimeter-wave radar 19, a LIDER (Light Detection and Ranging) 20, a clock 21, a speaker 22, an accelerator pedal sensor 23, a brake pedal sensor 24, a steering angle sensor 25, a throttle actuator 26, a brake actuator 27, a steering actuator 28, an automatic driving information DB 29, an inter-vehicle communication device 31, a road-vehicle communication device 32, a navigation device 33, and the automatic driving ECU 40.

The automatic driving switch 14 is switch that outputs a request level of the driving support of the vehicle requested by the driver, to the automatic driving ECU 40 in response to an operation by the driver. The automatic driving switch 14 outputs, for example, one of five request Levels 0-4 as a request level of the driving support.

The driving support level is a level at which the driving support device 12 executes the driving support for the vehicle, and represents the support degree of the driving support. The higher the driving support level is, the less the driver contributes to driving the vehicle.

FIG. 3 is a diagram illustrating an example of driving support levels of the driving support device 12, which summarizes a definition of levels of the automation by NHTSA (National Highway Traffic Safety Administration). FIG. 3 exemplifies contents of the driving support executed at each driving support level. The automatic driving switch 14 outputs one of Levels 0-4 as the request level depending on requested contents of the driving support as illustrated in FIG. 3. The greater the number of the level is, the higher the driving support level is. The driving support level represents an automation level of the automatic driving. The higher driving support level is, the higher the automation level is. The driving support level rises stepwise from Level 0 to Level 4. Level 0 represents a state in which there is no support for a driving operation.

FIG. 4 is a diagram illustrating another example of the driving support levels of the drive support device 12. FIG. 4 exemplifies contents of the driving support executed at each driving support level. Similar to the above example, the automatic driving switch 14 outputs one of Levels 0-4 as the request level depending on requested contents of the driving support as illustrated in FIG. 4.

Note that the request level output from the automatic driving switch 14 is a level that the driver requests the vehicle to provide. The driving support level of the drive support device 12 is finally determined by the automatic driving ECU 40 depending on the request level from the automatic driving switch 14, detection results of the situation of the vehicle, and the like. The drive support device 12 supports the driving of the vehicle by the driving support contents in accordance with the driving support level determined by the automatic driving ECU 40.

In FIG. 2, the GPS receiver 15 is an example of a vehicle position detector that detects a current position of the vehicle based on radio waves from GPS satellites.

The vehicle speed sensor 16 is an example of a vehicle speed detector that detects the speed of the vehicle.

The yaw rate sensor 17 is an example of a yaw rate detector that detects the yaw rate of the vehicle.

The camera 18 is an example of an image obtaining unit (an image detection unit) that obtains an image around the vehicle including the front direction of the vehicle. The camera 16 may obtain an image of the driver of the vehicle.

The millimeter-wave radar 19 is an example of a distance detector that detects the distance between the vehicle and an object existing around the vehicle (e.g., a preceding vehicle or an obstacle) by transmitting millimeter waves.

The LIDER 20 is an example of a three-dimensional position detector that detects the three-dimensional position of an object existing around the vehicle (e.g., a preceding vehicle or an obstacle).

The clock 21 is an example of a time information output unit (a time detector) that outputs information about the current time.

The speaker 22 is an example of a sound output unit that outputs a sound such as a warning.

The accelerator pedal sensor 23 is an example of an acceleration operation detector that detects the amount of operation of the accelerator pedal operated by the driver of the vehicle.

The brake pedal sensor 24 is an example of a brake operation detector that detects the amount of operation of the brake pedal operated by the driver of the vehicle.

The steering angle sensor 25 is an example of a steering operation detector that detects the amount of operation of the steering operated by the driver of the vehicle.

The throttle actuator 26 is an example of an acceleration amount adjuster that adjusts the amount of acceleration of the vehicle, by driving the throttle of the engine of the vehicle.

The brake actuator 27 is an example of a braking force adjuster that adjusts the braking force of the vehicles.

The steering actuator 2 is an example of a steering angle adjuster that adjusts the steering angle of the tires of the vehicle.

The automatic driving information DB 29 is a database to accumulate map information and the like to be used for the driving support (particularly, for fully automatic driving), which may be referred to as a "dynamic map". The automatic driving information DB 29 accumulates static or dynamic information, for example, three-dimensional road shape information, road regulation formation, accident information, weather information, and the like.

The inter-vehicle communication device 31 is an example of an inter-vehicle communication unit that wirelessly transmits and receives information between the vehicle and another vehicle.

The road-vehicle communication device 32 is an example of a road-vehicle communication unit that wirelessly transmits and receives information between the vehicle and a roadside facility.

The navigation device 33 is an example of a route guide unit to guide the driver through a traveling route of the vehicle. The navigation device 33 includes, for example, a display 34 and a navigation ECU 35. The navigation device 33 is an example of an information providing device that provides information to the occupant of the vehicle.

The display 34 is an example of a display unit that visually provides information to the occupant such as the driver. The display 34 displays information provided by the server 3. The display 34 is an example of the display unit.

The navigation ECU 35 is an example of an electronic control unit that controls guiding the driver through a traveling route of the vehicle.

The automatic driving ECU 40 is an example of an electronic control unit that controls an operation of the driving support (including the automatic driving) of the vehicle. The automatic driving ECU 40 may include one or more ECUs. If the automatic driving ECU 40 includes multiple ECUs, the ECUs are connected with each other via communication channels of, for example, CAN (Controller Area Network). Although FIG. 2 illustrates the automatic driving ECU 40 and the other units forming one-to-one connections, respectively, the automatic driving ECU 40 and the other units may be connected with each other via communication channels of CAN (Controller Area Network) or the like. Alternatively, the units may be connected with each other without the automatic driving ECU 40 intervening.

For example, the display 34 and the navigation ECU 35 may be connected with each other without the automatic driving ECU 40 intervening, and the navigation device 33 and the communication module 13 may be connected with each other without the automatic driving ECU 40 intervening.

Figure 5:
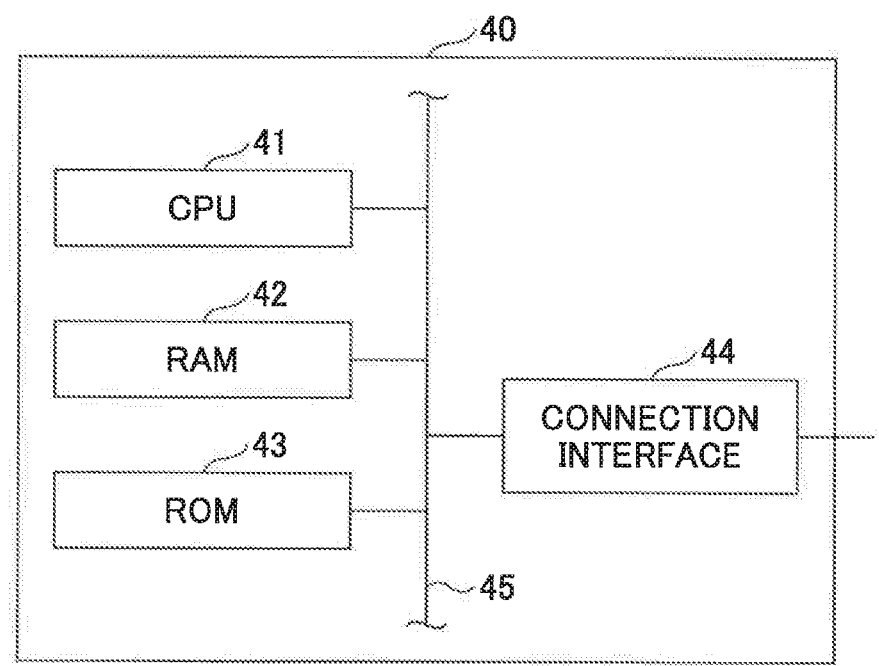
FIG. 5 is a diagram schematically illustrating an example of a hardware configuration of an automatic driving ECU.

FIG. 5 is a diagram schematically illustrating an example of a hardware configuration of the automatic driving ECU 40. The automatic driving ECU 40 includes a CPU (Central Processing Unit) 41, a RAM (Random Access Memory) 42, a ROM (Read-Only Memory) 43, and a connection interface 44. The CPU 41, the RAM 42, the ROM 43, and the connection interface 44 are connected with each other via a bus 45. The automatic driving ECU 40 includes, for example, a microcomputer having the CPU 41, the RAM 42, and the ROM 43 built in. The automatic driving ECU 40 is connected to devices such as the communication module 13 through the connection interface 44.

Note that since the hardware configuration of the navigation ECU 35 (see FIG. 2) is substantially the same as the hardware configuration of the automatic driving ECU 40 illustrated in FIG. 5, the illustration and description are omitted.

Also, since the hardware configuration of the in-vehicle control device 10 installed in the information-provision-destination vehicle 7 (see FIG. 1) is substantially the same as the hardware configuration of the in-vehicle control device 2 illustrated in FIG. 2 and FIG. 5, the illustration and description are omitted.

Figure 6:
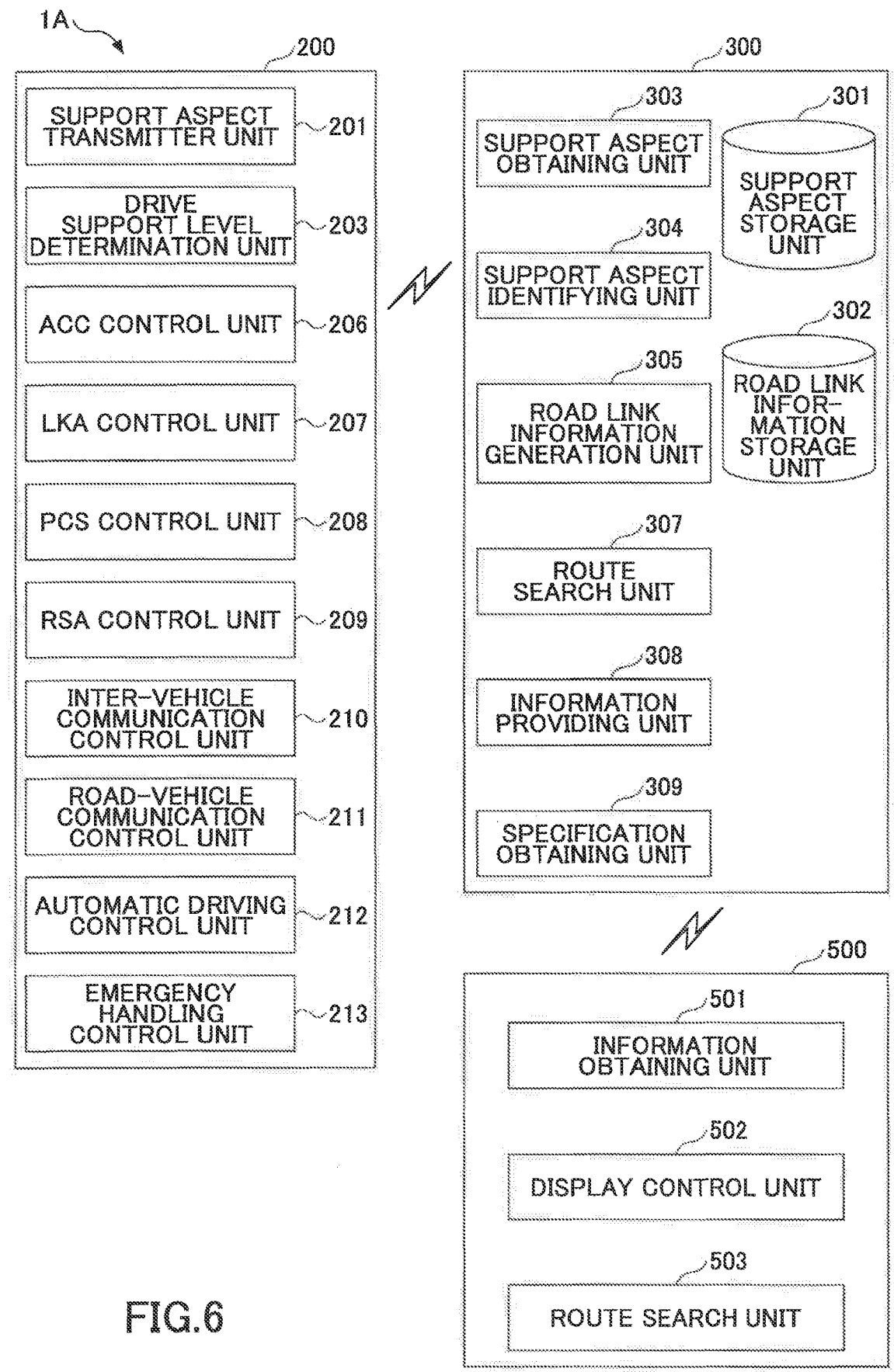
FIG. 6 is a block diagram illustrating an example of a functional configuration of an information providing system.

FIG. 6 is a block diagram illustrating an example of a functional configuration of an information providing system 1A. The information providing system 1A is an example of the information providing system 1 illustrated in FIG. 1, and includes an in-vehicle control device 200, a server 300, and a navigation device 500. The in-vehicle control device 200 is an example of the in-vehicle control device 2; the server 300 is an example of the server 3; and the navigation device 500 is an example of the navigation device 33 installed in the information-provision-destination vehicle 7 (an example of the information providing device).

In FIG. 6, the in-vehicle control device 200 includes a support aspect transmitter unit 201, a drive support level determination unit 203, an ACC (Adaptive Cruise Control) control unit 206, an LKA (Lane Keeping Assist) control unit 207, a PCS (Pre-Crash Safety) control unit 208, an RSA (Road Sign Assist) control unit 209, an inter-vehicle communication control unit 210, a road-vehicle communication control unit 211, an automatic driving control unit 212, and an emergency handling control unit 213. The functions of the units 201-213 are implemented by the CPU 41 (see FIG. 5) running a program stored in the ROM 43 (see FIG. 5).

The support aspect transmitter unit 201 transmits wirelessly or by wire a support aspect of the driving support executed by the driving support device 12 of the vehicle on each of the road links to the server 300 by the communication module 13 (see FIG. 2) along with the vehicle ID of the vehicle.

The road link is one of the map information items, representing a road element having two nodes at the both ends. Adjacent road elements (road links) are connected to a node. The node corresponds to a junction such as an intersection. The user ID is identification information to identify the vehicle, the driver of the vehicle, or the in-vehicle control device 200 installed in the vehicle.

The support aspects of the driving support executed by the driving support device 12 includes, for example, the execution position of the driving support, the execution time of the driving support, the execution period of the driving support, the execution distance of the driving support, the execution environment of the driving support, the driving support level of the driving support device 12 in the execution period of the driving support, the driving support function activated in the execution period of the driving support, the activation position of the driving support function, the activation time of the driving support function, the activation period of the driving support function, the activation distance of the driving support function, and the activation environment of the driving support function.

Note that the execution position of the driving support represents a position of the vehicle in the execution period of the driving support. The execution time of the driving support represents time in the execution period of the driving support. The execution distance of the driving support represents the travel distance of the vehicle during the execution period of the driving support. The execution environment of the driving support represents the environment of the vehicle during the execution period of the driving support. The activation position of the driving support function represents a position of the vehicle in the activation period of the driving support function. The activation time of the driving support function represents time in the activation period of the driving support function. The activation distance of the driving support function represents the travel distance of the vehicle in the activation period of the driving support function. The activation environment of the driving support function represents the environment of the vehicle in the activation period of the driving support function.

Figure 7:
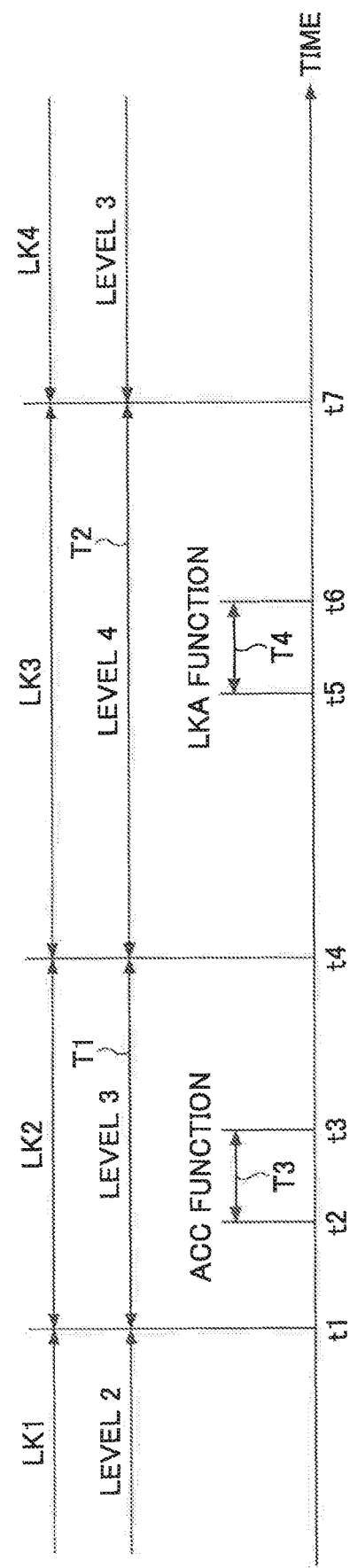
FIG. 7 is a timing chart illustrating a relationship between the driving support executed by a driving support device, and driving support functions activated in execution periods of the driving support executed by the driving support device.

FIG. 7 is a timing chart illustrating a relationship between the driving support executed by the driving support device 12, and driving support functions activated in execution periods of the driving support executed by the driving support device 12. LK1 to LK4 represent road links, respectively. Levels 2, 3, and 4 represent driving support levels of the driving support device 12 determined by the drive support level determination unit 203, respectively, as will be described in detail later. The ACC function and the LKA function are examples of the driving support functions activated by the driving support device 12, respectively, as will be described in detail later.

In the case of FIG. 7, the driving support device 12 executes the driving support at Level 3 among the driving support levels on the road link LK2 in an execution period T1 (t1 to t4), and executes the driving support at Level 4 among the driving support levels on the road link LK3 in an execution period T2 (t4 to t7) The driving support device 12 activates the ACC function during an activation period T3 (t2 to t3) in the execution period T1 while traveling on the road link LK2, and activates the LKA function during an activation period T4 (t5 to t6) in the execution period T2 while traveling on the road link LK3.

In FIG. 6, the drive support level determination unit 203 is an example of a unit that determines the driving support level of the drive support device 12.

An example of the method for determining the driving support level will be described. If one of the ACC control function, the LKA control function, the PCS control function, and the RSA control function is in an enabled state, the drive support level determination unit 203 determines the driving support level as Level 1. If all of the ACC control function, the LKA control function, the PCS control function, and the RSA control function are in enabled states, the drive support level determination unit 203 determines the driving support level as Level 2. If all of the ACC control function, the LKA control function, the PCS control function, the RCA control function, the inter-vehicle communication facility, the road-vehicle-communication function, and the automatic driving function are in enabled states, the drive support level determination unit 203 determines the driving support level as Level 3. If all of the functions for Level 3 and an emergency handling function are in enabled states, the drive support level determination unit 203 determines the driving support level as Level 4.

Here, a "state in which a control function is enabled" means a state in which the control function is turned on; specifically, a state in which the control function is actually activated, or a state in which activation of the control function is permitted. For example, a state in which the PCS control function is enabled is a state in which automatic braking by the PCS control function is actually activated, or a state in which activation of the automatic braking is permitted. A "state in which a control function is not enabled (namely, a disabled state)" means a state in which activation of the control function is inhibited.

For example, the drive support level determination unit 203 refers to operational information representing whether the control function of each control unit is an enabled state or a disabled state (e.g., a flag), to determine whether the control function is in an enabled state.

The control functions will be briefly described below.

The ACC control function executed by the ACC control unit 206 is one of the driving support functions that makes the vehicle travel following a preceding vehicle while maintaining an appropriate distance between the two vehicles by using the millimeter-wave radar 19 (see FIG. 2) and the like, within a speed range set in advance.

The LKA control function executed by the LKA control unit 207 is one of the driving support functions that makes the vehicle travel along a traffic lane recognized by the camera 18 (see FIG. 2) and the like.

The PCS control function executed by the PCS control unit 208 is one of the driving support functions that senses a collision in advance by the camera 18 and the like to be prepared for the collision for reducing the damage. If having determined that there is a likelihood of a collision, the PCS control function issues a warning from the speaker 22 (see FIG. 2) to prompt the driver to perform a brake operation, or if having determined that the collision is inevitable, activates automatic braking.

The RSA control function executed by the RSA control unit 209 is one of the driving support functions that recognizes a sign by the camera 18, and informs the driver of information about the recognized sign by displaying on the display 34 (see FIG. 2).

The inter-vehicle communication function executed by the inter-vehicle communication control unit 210 is one of the driving support functions that controls wirelessly transmitting and receiving information between the vehicle and another vehicle, by using the inter-vehicle communication device 31 (see FIG. 2).

The road-vehicle-communication function executed by the road-vehicle communication control unit 211 is one of the driving support functions that controls wirelessly transmitting and receiving information between the vehicle and a roadside facility, by using the road-vehicle communication device 32 (see FIG. 2).

The automatic driving function executed by the automatic driving control unit 212 is one of the driving support functions that precisely recognizes the vehicle, another vehicle, a walker, an obstacle, and the like, based on the information provided by the LIDER 20, the automatic driving information DB 29, and the like (see FIG. 2), so as to execute automatic driving a traveling aspect calculated to obey traffic rules.

The emergency handling function executed by the emergency handling control unit 213 is one of the driving support functions that evaluates risk of executing emergency handling operations if an emergency avoidance or an emergency braking is necessary, and automatically executes an emergency handling operation having the lowest risk.

On the other hand, in FIG. 6, the server 300 includes a support aspect obtaining unit 303, a support aspect identifying unit 304, a road link information generation unit 305, a route search unit 307, an information providing unit 308, a specification obtaining unit 309, a support aspect storage unit 301, and a road link information storage unit 302.

Since the hardware configuration of the server 300 is substantially the same as the hardware configuration of the automatic driving ECU 40 illustrated in FIG. 5, the illustration is omitted. The support aspect obtaining unit 303, the support aspect identifying unit 304, the road link information generation unit 305, the route search unit 307, the information providing unit 308, and the specification obtaining unit 309 are implemented by the CPU running a program stored in the ROM.

The support aspect obtaining unit 303 obtains the support aspect of the driving support executed by the driving support device 12 of each of the vehicles on each of the road links, from the vehicle by wireless communication. The support aspect of the driving support executed by the driving support device 12 of each of the vehicles on each of the road links, is transmitted by the support aspect transmitter unit 201 of the in-vehicle control device 200 of the vehicle. The support aspect obtaining unit 303 stores the obtained support aspects of the vehicles in a storage area of the support aspect storage unit 301 for each of the road links.

Note that the support aspect obtaining unit 303 may obtain the support aspect of the driving support executed by the driving support device of each of the vehicles on each of the road links, by wired communication from the vehicles. For example, the support aspect obtaining unit 303 may obtain the support aspects of the driving support executed by the driving support device of the vehicle on the respective road links when the vehicle is left at a dealer parking lot or parked at home, through a wired communication channel at the dealer or at home.

The support aspect storage unit 301 is a database to accumulate the support aspect transmitted from the support aspect transmitter unit 201 of the in-vehicle control device 200 (the support aspects of the driving support executed by the driving support device 12 of each of the vehicles on each of the road links).

FIG. 8 is a diagram illustrating an example of support aspects executed on respective road links stored in the support aspect storage unit 301. The support aspect obtaining unit 303 stores support aspects of the driving support executed by the driving support device 12 of each of the vehicles on each road link ID, for each vehicle ID. FIG. 8 exemplifies the support aspects for the vehicles having the vehicle IDs C1, C2, and C3, respectively. The road link ID is identification information to identify a road link.

For example, FIG. 8 illustrates that the driving support device 12 installed in the vehicle having the vehicle ID C1 has activated the ACC control function while executing the driving support at Level 3 among the driving support levels on the road link LK1, at an activation position p1, at an activation time t11, for an activation distance d11, in an activation environment e11. In this way, the support aspects of the driving support executed by the driving support device 12 of each of the vehicles on each road link ID are stored.

In FIG. 6, the support aspect identifying unit 304 identifies support aspects of the driving support executable on each of the road links, based on the support aspects obtained by the support aspect obtaining unit 303 from the vehicles and stored in the support aspect storage unit 301, following predetermined specific criteria to identify the executable support aspects of the driving support.

For example, the support aspect identifying unit 304 identifies a driving support level that has been executed most frequently on a road link, as the driving support level executable on the road link. In the case of FIG. 8, the support aspect identifying unit 304 identifies Level 4 that has been executed most frequently on the road link LK3, as the driving support level executable on the road link LK3.

Similarly, for example, the support aspect identifying unit 304 identifies a driving support function that has been activated most frequently on a road link, as the driving support function that can be activated on the road link. In the case of FIG. 8, the support aspect identifying unit 304 identifies the ACC function that has been activated most frequently on the road link LK2, as the driving support function that can be activated on the road link LK2.

Similarly, for example, the support aspect identifying unit 304 identifies a position where the driving support has been executed most frequently on a road link, as the position where the driving support can be executed on the road link. Similar the support aspect identifying unit 304 identifies a position where the driving support function has been activated most frequently on a road link, as the position where the driving support function can be activated on the road link. In the case of FIG. 8, the support aspect identifying unit 304 identifies a position p2 where the ACC function has been activated most frequently on the road link LK2, as the position where the ACC function can be activated on the road link LK2.

Similarly, for the other support aspects such as the activation time, the support aspect identifying unit 304 identifies a specific support aspect of the driving support executable on each of the road links.

In FIG. 6, the road link information generation unit 305 generates the road link information in which the support aspect identified by the support aspect identifying unit 304 is associated with data for each of the road links, and stores the generated road link information in a storage area of the road link information storage unit 302.

The road link information storage unit 302 is a database to accumulate the road link information in which the support aspect of the executable driving support is associated with the data of the road link for each of the road links.

FIG. 9 is a diagram illustrating an example of the road link information of road links stored the road link information storage unit 302. FIG. 9 exemplifies attribute data items of the road links in which data items of each road link include the road link ID, the length of the road link, the position of the road link, the width of the road link, and the road type of the road link. The road link information generation unit 305 associates the data of the road link with the support aspect identified by the support aspect identifying unit 304 for each of the road links to generate the road link information, and stores the generated road link information in the road link information storage unit 302.

In FIG. 6, the route search unit 307 searches for a route passing through road links on which the driving support is executable in the support aspects identified by the support aspect identifying unit 304, based on the road link information generated by the road link information generation unit 305. For example, the route search unit 307 searches for a route having the minimum total cost of the road links to the destination that lowers the cost of the road links on which the driving support is executable in the support aspects identified by the support aspect identifying unit 304.

More specifically, the route search unit 307 searches for a route passing through road links on which the driving support is executable in the support aspects, for example, defined in the road link information stored in the road link information storage unit 302 (see FIG. 9).

The information providing unit 308 provides the route searched for by the route search unit 307, to an information service destination such as the information-provision-destination vehicle 7. In this way, a route passing through road links on which the driving support is executable in the support aspects identified by the support aspect identifying unit 304, is provided to an information service destination. Therefore, the information service destination can properly grasp which one of the support aspects of the driving support is executable on which one of the roads.

The information providing unit 308 transmits wirelessly or by wire, for example, the route searched for by the route search unit 307, to the navigation device 500 of the information-provision-destination vehicle 7.

The navigation device 33 includes an information obtaining unit 501. The information obtaining unit 501 obtains the route transmitted wirelessly or by wire from the information providing unit 308 (the route passing through the road links on which the driving support is executable in the support aspects identified by the support aspect identifying unit 304). A display control unit 502 displays the route obtained by the information obtaining unit 501 on the display 34 of the vehicle (see FIG. 2). This makes it possible to visually provide information about which one of the support aspects of the driving support is executable on which one of the roads by displaying the route, to the occupant of the information-provision-destination vehicle 7.

The information providing unit 308 may transmit wirelessly or by wire the route searched for by the route search unit 307, to the information providing terminal 6 (see FIG. 1). In this case, the information providing terminal 6 displays the route transmitted from the information providing unit 308 on the display 6a. This makes it possible to visually provide information about which one of the support aspects of the driving support is executable on which one of the roads by displaying the route, to the user of the information providing terminal 6.

The information providing unit 308 may transmit wirelessly or by wire the route searched for by the route search unit 307, to the information service destination server 5 (see FIG. 1). In this case, the information service destination server 5 stores the information about the route transmitted from the information providing unit 308 in the database 510. This makes it possible to accumulate information about which one of the support aspects of the driving support is executable on which one of the roads. Therefore, the information about the routes accumulated in the database 510 can be used for services such as calculating the premium for the vehicle.

Note that as illustrated in FIG. 6 and FIG. 8, the support aspects obtained by the support aspect obtaining unit 303 from each of the vehicles, and the support aspects identified by the support aspect identifying unit 304 may include driving support levels that represent the support degrees of the driving support. In this case, it is preferable that the route search unit 307 prioritizes searching for a route passing through road links on which the driving support is executable at a driving support level higher than a certain driving support level, over searching for a route passing through the road links on which the driving support is executable at the certain driving support level. For example, the route search unit 307 searches for a route having the minimum total cost of road links to the destination that lowers the cost of the road links on which the driving support is executable in driving support level higher than the certain driving support level than the cost of the road links on which the driving support is executable at the certain driving support level. The information providing unit 308 provides the route searched for by the route search unit 307 by prioritizing in this way, to an information service destination such as the information-provision-destination vehicle 7.

This makes it possible to provide information to an information service destination, with prioritizing a route passing through the road links on which the driving support is executable at a driving support level higher than a certain driving support level, over a route passing through the road links on which the driving support is executable at the certain driving support level. Therefore, for example, the driver of the information-provision-destination vehicle 7 can make the vehicle travel on a route on which the driving support is executed at a comparatively high driving support level.

Also, is preferable that the server 300 includes the specification obtaining unit 309 that obtains the specification of the driving support that can be executed by the information service destination via at least one of a wireless communication channel and a wired communication channel. The route search unit 307 searches for a route passing through road links on which the driving support can be executed based on the specification obtained by the specification obtaining unit 309. For example, the route search unit 307 searches for a route having the minimum total cost of the road links to the destination that lowers the cost of the road links on which the driving support can be executed, based on the specification obtained by the specification obtaining unit 309. Taking the specification obtained by the specification obtaining unit 309 into account, the information providing unit 308 provides the prioritized route searched for by the route search unit 307, to the information service destination from which the specification obtaining unit 309 has obtained the specification. The types of executable driving support vary depending on the type or model year of a vehicle that can execute driving support, or the specification of software implementing the driving support, such as the version and the like. Therefore, by taking the specification obtained by the specification obtaining unit 309 into account, it is possible to provide information about a route suitable for the specification of the driving support that can be executed by the information service destination, to the information service destination.

The information providing unit 308 may provide the road link information generated by the road link information generation unit 305 to an information service destination such as the information-provision-destination vehicle 7, by using at least one of a wireless communication channel and a wired communication channel. This makes it possible to provide the road link information in which the support aspect of the driving support that can be executed by the driving support device is associated with the data of the road link, to the information service destination. Therefore, the information service destination can properly grasp which one of the support aspects of the driving support is executable on which one of the roads.

For example, the information providing unit 308 transmits wirelessly or by wire the road link information generated by the road link information generation unit, to the navigation device 500 of the information-provision-destination vehicle 7.

The information obtaining unit 501 of the navigation device 500 obtains the road link information (the road link information in which the support aspect, which has been identified by the support aspect identifying unit 304 as a support aspect of the driving support that can be executed, is associated with the data of the road link for each of the road links) transmitted wirelessly or by wire from the information providing unit 308.

The display control unit 502 controls display aspects of the road links to be displayed on the display 34, for example, based on the road link information obtained by the information obtaining unit 501 from the server 300 via wireless communication or wired communication. The display control unit 502 sets the display aspects of the road links to be displayed on the display 34 to different aspects depending on the support aspects included in the road link information obtained by the information obtaining unit 501 (the support aspect identified by the support aspect identifying unit 304 as the support aspect of the driving support that can be executed). This makes the display aspects of the road links to be displayed on the display 34 change depending on the support aspects of the driving support that can be executed. Therefore, it is possible to visually provide information about which one of the support aspects of the driving support is executable on which one of the roads, to the occupant of the information-provision-destination vehicle 7. Consequently, the occupant can visually recognize differences of the support aspects of the driving support for each of the road links easily and properly.

For example, the display control unit 502 may change display colors of the road links on which the driving support is executable in the support aspects identified by the support aspect identifying unit 304. The display control unit 502 may highlight or blink when displaying the road links on which the driving support is executable in the support aspects identified by the support aspect identifying unit 304).

Similarly, the information providing unit 308 may transmit wirelessly or by wire the road link information generated by the road link information generation unit 305, to the information providing terminal 6 (see FIG. 1). In this case, the information providing terminal 6 sets the display aspects of the road links to be displayed on the display 6a to different aspects depending on the support aspects included in the road link information transmitted from the information providing unit 308. This makes the display aspects of the road links to be displayed on the display 6a change depending on the support aspects of the executable driving support. Therefore, it is possible to visually provide information about which one of the support aspects of the driving support is executable on which one of the roads, to the user of to the information providing terminal 6, and the user can visually recognize differences of the support aspects of the driving support for each of the road links easily and properly.

The navigation device 500 may include a route search unit 503. This makes it possible to execute route search on the side of the navigation device 500, without using the route search by the route search unit 307 of the server 300. The route search unit 503 searches for a route passing through road links on which the driving support is executable in the support aspects identified by the support aspect identifying unit 304, based on the road link information obtained by the information obtaining unit 501 from the information providing unit 308. For example, the route search unit 503 searches for a route having the minimum total cost of the road links to the destination that lowers the cost of the road links on which the driving support is executable in the support aspects identified by the support aspect identifying unit 304.

More specifically, the route search unit 503 obtains, for example, the road link information stored in the road link information storage unit 302 from the server 300, and then, searches for a route passing through the road links on which the driving support is executable in the support aspects defined in the obtained road link information.

The display control unit 502 displays the route searched for by the route search unit 503 on the display 34 of the vehicle (see FIG. 2). In this way, a route is displayed on the display 34 that passes through the road links on which the driving support is executable in the support aspects obtained from the server 300 as the support aspects of the driving support that can be executed. Therefore, it is possible to visually provide information about which one of the support aspects of the driving support is executable on which one of the roads by displaying the route, to the occupant of the information-provision-destination vehicle 7.

Note that if the information providing terminal 6 has the same functions as the route search unit 503, the information providing terminal 6 can display the route searched for by the route search unit on the display 6a. Thus, a route passing through the road links on which the driving support is executable in the support aspects obtained from the server 300 as the support aspects of the driving support that can be executed, is displayed on the display 6a. Therefore, it is possible to visually provide information about which one of the support aspects of the driving support is executable on which one of the roads by displaying the route, for the user of the information providing terminal 6.

For example, in a case where one of the road links includes multiple sections on which different support aspects of the driving support are to be executed, the support aspect identifying unit 304 identifies the support aspect of the driving support executable on each of the different sections. In this case, the road link information generation unit 305 generates the road link information in which the support aspect identified by the support aspect identifying unit 304 is associated with data of each of the different sections of the road link. Then, the information providing unit 308 provides the road link information generated by the road link information generation unit 305 to an information service destination.

In this way, even if one of the road links includes sections on which different support aspects of the driving support are to be executed, it is possible to provide information about what types of the support aspects of the driving support can be executed on the respective sections, to an information service destination such as the information-provision-destination vehicle 7.

For example, consider a case in which one road link is divided into a first section on which the driving support has been executed at Level 4 among the driving support levels, and a second section on which the driving support has been executed at Level 2 among the driving support levels. In this case, the support aspect identifying unit 304 can identify, for example, the driving support level executable on the first section is Level 4, and the driving support level executable on the second section is Level 2. Thus, the road link information generation unit 305 can generate first road link information in which the drive support level of Level 4 is associated with the data of the first section of the road link, and can generate second road link information in which the drive support level of Level 2 is associated with the data of the second section of the road link. Therefore, even if the road link includes the sections on which the different support levels of the driving support have been executed, it is possible to provide information about which one of the driving support levels of the driving support is executable in each section, to an information service destination such as the information-provision-destination vehicle 7.

It is preferable that the display control unit 502 displays a road link on which the driving support is executable at a certain driving support level by highlighting more on the display 34 of the vehicle than a road link on which the driving support is executable at a driving support level lower than the certain driving support level. Thus, displaying the road link on which the driving support is executable at the certain driving support level, is highlighted in contrast to displaying the road link on which the driving support is executable at a comparatively low driving support level. This makes it possible for the occupant of the information-provision-destination vehicle 7 to visually recognize the road link on which the driving support is executable at a comparatively high driving support level easily.

For example, the display control unit 502 may change the display color of a road link on which the driving support is executable at a driving support level higher than a predetermined driving support level. Alternatively, the display control unit 502 may highlight or blink when displaying the road link on which the driving support is executable at the driving support level higher than the predetermined driving support level.

Similarly, the information providing terminal 6 may highlight a road link on which the driving support is executable at a certain driving support level on the display 6a, in contrast to a road link on which the driving support is executable at a second driving support level lower than the driving support level.

It is preferable that the route search unit 503 prioritizes searching for a route passing through road links on which the driving support is executable at a driving support level higher than a certain driving support level, over searching for a route passing through road links on which the driving support is executable at the certain driving support level. For example, the route search unit 503, searches for a route having the minimum total cost of the road links to the destination that lowers the cost of the road links on which the driving support is executable at a driving support level higher than the certain driving support level is executable more than the cost of the road links on which the driving support is executable at the certain driving support level. The display control unit 502 displays the route searched for by the route search unit 503 by prioritizing in this way on the display 34.

This makes it possible to provide information to the occupant of the information-provision-destination vehicle 7, prioritizing a road link on which the driving support is executable at a driving support level higher than the certain driving support level, over a route passing through the road links on which the driving support is executable at the certain driving support level. Therefore, for example, the driver of the information-provision-destination vehicle 7 can make the vehicle travel on the route on which the driving support is executed at the comparatively high driving support level.

Similarly, if the information providing terminal 6 has the same functions as the route search unit 503, it is possible to provide information to the user of the information providing terminal 6, prioritizing a road link on which the driving support is executable at a driving support level higher than the certain driving support level, over a route passing through the road links on which the driving support is executable at the certain driving support level.

Note that since the hardware configuration of the navigational ECU of the navigation device 500 is substantially the same as the hardware configuration of the automatic driving ECU 40 illustrated in FIG. 5, the illustration is omitted. The information obtaining unit 501, the display control unit 502, and the route search unit 503, are implemented by the CPU running a program stored in the ROM.

Figure 10:
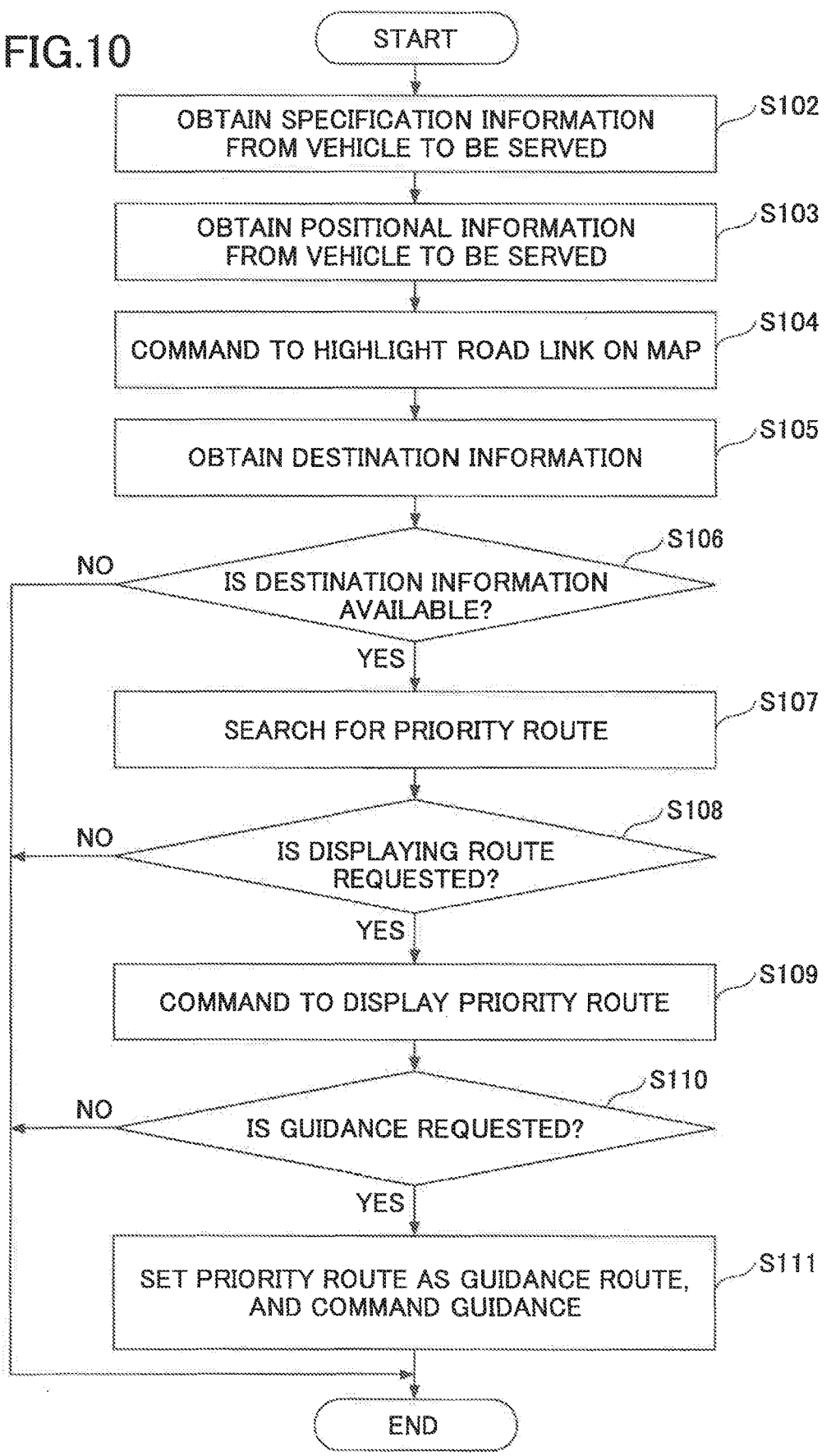
FIG. 10 is a flowchart illustrating an example of operations of a server.

FIG. 10 is a flowchart illustrating an example of operations of the server 300. FIG. 10 illustrates a case in which the route search unit 307 searches for a route passing through road links on which the driving support is executable in the support aspects that have been identified in the road link information stored in the road link information storage unit 302, and the information providing unit 308 provides the search result to the information-provision-destination vehicle 7. Note that at each step in FIG. 10, the communication between the server 300 and the information-provision-destination vehicle 7 is not limited to wireless communication but may be wired communication.

At Step S102, the specification obtaining unit 309 obtains the specification of the driving support that can be executed by the information-provision-destination vehicle 7 from the information-provision-destination vehicle 7. At Step S103, the route search unit 307 obtains positional information of the information-provision-destination vehicle 7 from the information-provision-destination vehicle 7. At Step S104, the route search unit 307 outputs a command to highlight a road link on which the driving support can be executed among road links on a map displayed on the display 34, to the information-provision-destination vehicle 7.

Figure 11:
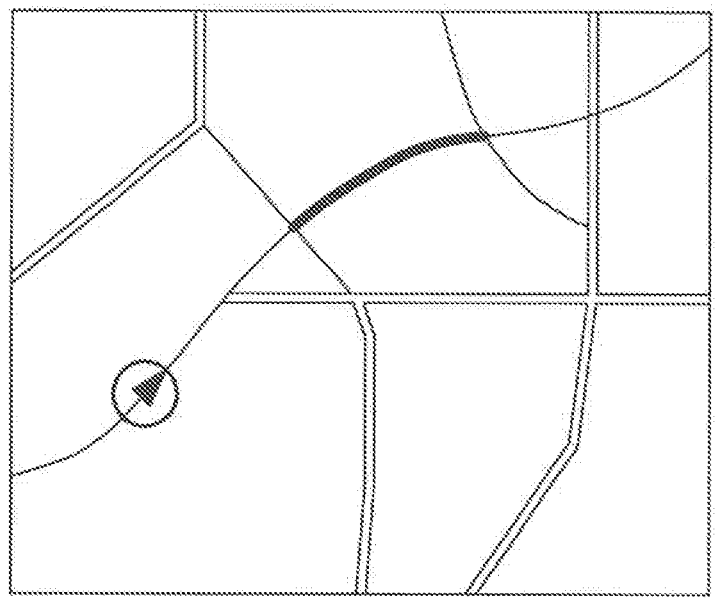
FIG. 11 is a diagram schematically illustrating an example of highlighting.

FIG. 11 is a diagram schematically illustrating an example of the highlighting. The display control unit 502 highlights the road link on which the driving support can be executed, in response to the command to highlight from the route search unit 307. FIG. 11 illustrates in an example in which the display control unit 502 changes the thickness of the road link. The display control unit 502 may change the color of the road link on which the driving support is executable into a color different from the color of the road links on which the driving support cannot be executed. The display control unit

502 may highlight the road link when an automatic driving map mode is selected by a driver to display the map for the automatic driving.

At Step S105 in FIG. 10, the route search unit 307 obtains the destination information of the information-provision-destination vehicle 7 from the information-provision-destination vehicle 7, and at Step S106, determines whether the obtained destination information is included in the map database. If having determined that the obtained destination information is included in the map database, the route search unit 307 executes Step S107.

At Step S107, the route search unit 307 searches for a route passing through road links on which the driving support is executable in the support aspects that have been defined in the road link information stored in the road link information storage unit 302. For example, the route search unit 307 prioritizes searching for a route passing through road links on which the driving support is executable at a comparatively high driving support level, over searching for a route passing through road links on which the driving support is executable at a comparatively low driving support level. Furthermore, the route search unit 307 searches for a route passing through road links on which the driving support can be executed based on the specification obtained by the specification obtaining unit 309 at Step S102.

Note that there may be cases such that the specification obtaining unit 309 cannot obtain the specification at Step S102; detailed road link information is not stored in the road link information storage unit 302; simple route search is desired; and the like. In such cases, the route search unit 307 searches for a route having the minimum total cost of the road links to the destination that lowers the cost of the road links on which the driving support is executable at a predetermined level or higher.

At Step S103, the route search unit 307 determines whether there is a request for displaying the prioritized route searched for by the route search unit 307 from the information-provision-destination vehicle 7. If having determined that there is a request for displaying the prioritized route, the route search unit 307 executes Step S109.

At Step S109, the route search unit 307 outputs a command to display the prioritized route searched for by the route search unit 307 at Step S107, to the information-provision-destination vehicle 7 through the information providing unit 308. Thus, the display control unit 502 can display the route searched for and provided through the information providing unit 308 on the display 34.

At Step S110, the route search unit 307 determines whether there is a request for guidance of the route searched for y the route search unit 307 from the information-provision-destination vehicle 7. If having determined that there is a request for guidance of the route, the route search unit 307 executes Step S111.

At Step S111, the route search unit 307 sets the prioritized route searched for by the route search unit 307 as the guidance route, and outputs a command to guide through the set guidance route to the information-provision-destination vehicle 7 through the information providing unit 308. Thus, the display control unit 502 can display the guidance route provided through the information providing unit 308 on the display 34.

FIG. 12 is a flowchart illustrating an example of operations of the navigation device 500 installed in the information-provision-destination vehicle 7. FIG. 12 illustrates a case in which the route search unit 503 obtains the road link information stored in the road link information storage unit 302 from the server 300, and searches for a route passing through road links on which the driving support is executable in the support aspects defined in the obtained road link information. Note that at each step of FIG. 12, the communication between the server 300 and the information-provision-destination vehicle 7 is not limited to wireless communication but may be wired communication.

At Step S202, the route search unit 503 obtains the positional information of the vehicle. At Step S203, the route search unit 503 makes a connection to the road link information storage unit 302 by wireless communication or wired communication, and obtains the road link information from the road link information storage unit 302 through the information providing unit 308. At Step S204, the route search unit 503 outputs a command to highlight a road link on which the driving support can be executed among the road links on the map displayed on the display 34, to the display control unit 502 (see FIG. 11).

At Step S205 in FIG. 12, the route search unit 503 obtains the destination information of the vehicle, and at Step S206, determines whether the obtained destination information is included in the map database. If having determined that the obtained destination information is included in the map database, the route search unit 503 executes Step S207.

At Step S207, the route search unit 503 searches for a route passing through road links on which the driving support is executable in the support aspects defined in the obtained road link information obtained at Step S203. For example, the route search unit 503 prioritizes searching for a route passing through road links on which the driving support is executable at a comparatively high driving support level, over searching for a route passing through road links on which the driving support is executable at a comparatively low driving support level.

Note that there may be cases where the support aspect is not defined in detail in the obtained road link information; simple route search is desired; and the like. In such cases, the route search unit 503 searches for a route having the minimum total cost of the road links to the destination that lowers the cost of the road link on which the driving support can be executed at a predetermined level or higher.

At Step S208, the display control unit 502 determines whether there is a request for displaying the prioritized route searched for by the route search unit 503 from the occupant of the vehicle. If having determined that there is a request for displaying the prioritized route, the display control unit 502 executes Step S209.

At Step S209, the display control unit 502 displays the prioritized route searched for by the route search unit 503 at Step S207 on the display 34. Thus, the display control unit 502 can make the occupant of the vehicle visually recognize the route searched for.

At Step S210, the display control unit 502 determines whether there is a request for guidance of the route searched for by the route search unit 503 from the occupant of the vehicle. If having determined that there is a request for guidance of the route, the display control unit 502 executes Step S211.

At Step S211, the display control unit 502 sets the prioritized route searched for by the route search unit 503 as the guidance route, and displays the guidance through the set guidance route on the display 34. Thus, the display control unit 502 can make the occupant of the vehicle visually recognize the guidance route.

So far, the server and the information providing device have been described with the embodiments. Note that the present invention is not limited to the above embodiments. Various modifications and improvements can be made within the scope of the present invention, by combining and/or replacing a part of or all of the embodiments with the others.

For example, the driving support levels illustrated in FIGS. 3 and 4 are just examples. The driving support levels just need to be specified in stages in terms of the support degrees of the driving support, which may be classified in more detail or much simplified. Also, the contents of the driving support assigned to the respective driving support levels are also examples.

Also, for example, the information service destination is not limited to an insurance company. An infrastructure construction company using the information service destination server 5 may use the information provided by the server 3 (for example, the road link information in which the support aspect of the executable driving support is associated with data of the road link on each of the road links). The infrastructure construction company can make a repair plan of the roads based on the ratios of the driving support levels of the road links and the like.

Also, for example, the road link information generation unit 305 may generate the road link information in which the support aspect obtained by the support aspect obtaining unit 303 is associated with the data for each of the road links, to store the generated road link information in a storage area of the road link information storage unit 302. In this case, the route search unit 307 or the route search unit 503 searches for a route passing through road links on which the driving support can be executed based on a support aspect obtained by the support aspect obtaining unit 303, based on the road link information generated by the road link information generation unit 305. The display control unit 502 sets the display aspects of the road links to be displayed on the display 34 to different aspects depending on the support aspects obtained by the support aspect obtaining unit 303. For example, the display control unit 502 may display the road link on which the driving support is executable in the support aspect obtained by the support aspect obtaining unit 303, by changing the display color, highlighting, or blinking.

Also, the information service destination such as the information-provision-destination vehicle 7 may include a support aspect identifying unit to identify the support aspect of the driving support that can be executed on each of the road links, based on the support aspects obtained by the support aspect obtaining unit from each of the vehicles. The information service destination such as the information-provision-destination vehicle 7 may include a road link information generation unit to generate the road link information in which the support aspect identified by the support aspect identifying unit is associated with the data of a road link for each of the road links.

Also, if one of the road links includes sections on which different support aspects of the driving support are to be executed, the road link information generation unit 305 may generate the road link information in which the support aspect obtained by the support aspect obtaining unit 303 is associated with the data of each of the different sections of the road link. Then, the information providing unit 308 provides the road link information generated by the road link information generation unit 305 to an information service destination. Thus, even if one of the road links includes sections on which different support aspects of the driving support are to be executed, it is possible to provide information about what types of the support aspects of the driving support can be executed on the respective sections, to an information service destination such as the information-provision-destination vehicle 7.

Also, the road link information storage unit that accumulates the road link information may be deployed in an information service destination such as the information-provision-destination vehicle 7, not in the server 300. Also, the road link information storage unit may be deployed in both the server 300 and the information service destination such as the information-provision-destination vehicle 7, provided the road link information to be stored in both storage units is synchronized.

The road link information in the road link information storage unit of an information service destination, such as the information-provision-destination vehicle 7, may be updated by direct communication with the server 300, or may be updated via a storage medium such as a memory card that stores the road link information downloaded from the server 300. Updating may be executed via a dealer terminal when the vehicle is left at a dealer. The road link information may be updated along with map data of the ire-vehicle navigation device.

Also, the highlighting at Step S104 in FIG. 10 and at Step S204 in FIG. 12 may be executed when the positional information of the vehicle is not obtained (e.g., when the driver is just looking at the map). Also, the display control unit 502 may change the highlighting aspect such as changing the display color of the road link, depending on the driving support levels defined in the road link information. For example, the display control unit 502 may display a road link on which the driving support is executable at a comparatively high driving support level by a striking display color, or may blink the road link fast, in contrast to a road link on which the driving support is executable at a comparatively low driving support level.

Also, the route search unit 307 may execute a route search, not only by the search condition prioritizing the driving support level, but also by a search condition prioritizing a matter other than the driving support level, and the display control unit 502 may display the search results under the respective search conditions together. The matter other than the driving support level may include, for example, the distance, the rate, and time. Also, only if the occupant selects the search condition prioritizing the driving support level, the route search unit 307 may execute a route search by the condition prioritizing the driving support level, to have the display control unit 502 display the search result under the search condition. Also, the route search unit 307 may learn preference of the driver so as to execute a route search under search conditions in which respective priority matters are weighted, to have the display control unit 502 display the search results under the search conditions. This is the same if the route search unit 503 executes the route search. Executing the route search in this way brings a search result in accordance with the preference of the driver.

The invention claimed is:

1. A server comprising:
a processor programmed to:
obtain, from each of a plurality of vehicles by communication, a support aspect of driving support executed by a driving support device of the vehicle on each of a plurality of road links, wherein the support aspect is determined as a driving automation support level for automation among three or more driving automation support levels that each represent a different degree of the driving support;
prioritize determining a greater automation support route passing through the road links on which the driving support is executable at a second driving support level having a greater degree of automation support than a first driving support level, over determining a lesser automation support route passing through the road links on which the driving support is executable at the first driving support level;

identify the support aspect of the driving support that has been activated most frequently on each of the road links, based on the obtained support aspects from each of the vehicles;

generate road link information based on the greater automation support route in which the identified support aspect is associated with data of the road link for each of the road links;

provide the generated road link information to an information service destination; and cause a vehicle or an information providing terminal provided in the vehicle, as the information service destination having received the road link information, to display the road link information so as to identify which one of the support aspects of the driving automation support levels is executable on which one of the road links.

2. The server as claimed in claim 1, wherein in a case where one of the road links includes a plurality of sections on which different support aspects of the driving support are to be executed, the processor generates the road link information in which the support aspect is associated with the data of the road link for each of the different sections.

3. The server as claimed in claim 1, wherein
in a case where one of the road links includes a plurality of sections on which different support aspects of the driving support are to be executed, the processor identifies the support aspect of the driving support executable on each of the different sections, and
the processor generates the road link information in which the identified support aspect is associated with the data of each of the different sections.

4. A server comprising:
a processor programmed to:
obtain, from each of a plurality of vehicles by communication, a support aspect of driving support executed by a driving support device of the vehicle on each of a plurality of road links, wherein the support aspect is determined as a driving automation support level for automation among three or more driving automation support levels that each represent a different degree of the driving support;
prioritize determining a greater automation support route passing through the road links on which the driving support is executable at a second driving support level having a greater degree of automation support than a first driving support level, over determining a lesser automation support route passing through the road links on which the driving support is executable at the first driving support level;
identify the support aspect of the driving support that has been activated most frequently on each of the road links, based on the obtained support aspects from each of the vehicles;
generate road link information based on the greater automation support route in which the identified support aspect is associated with data of the road link for each of the road links;
determine a route passing through the road links on which the driving support is executable in the identified support aspects, based on the generated road link information;
provide the determined route to an information service destination; and
cause a vehicle or an information providing terminal provided in the vehicle, as the information service destination having received the determined route, to display the determined route so as to identify which one of the support aspects of the driving automation support level is executable on which one of the road links.

5. The server as claimed in claim 4, wherein the processor is further programmed to:
obtain a specification of the driving support that can be executed by the information service destination,
wherein the processor determines a route passing through the road links on which the driving support can be executed based on the obtained specification.

6. An information providing device comprising:
a display provided in a vehicle; and
a processor connected to the display, the processor being configured to:
obtain, from a server by communication, road link information in which a support aspect of driving support that can be executed is associated with data of a road link for each of a plurality of road links, wherein the support aspect is determined as a driving automation support level for automation among three or more driving automation support levels that each represent a different degree of the driving support;
prioritize determining a greater automation support route passing through the road links on which the driving support is executable at a second driving support level having a greater degree of automation support than a first driving support level, over determining a lesser automation support route passing through the road links on which the driving support is executable at the first driving support level;
identify the support aspect of the driving support that has been activated most frequently on each of the road links, based on the obtained support aspects from each of the vehicles;
generate road link information based on the greater automation support route in which the identified support aspect is associated with data of the road link for each of the road links;
cause the display that is provided in the vehicle to display the generated road link information based on the greater automation support route so as to identify which one of the support aspects of the driving automation support level is executable on which one of the road links.

7. The information providing device as claimed in claim 6, wherein the processor is further programmed to:
determine a route passing through the road links on which the driving support is executable in the support aspects, based on the obtained road link information from the server,
wherein the processor displays the determined route on the display.

8. The information providing device as claimed in claim 6, wherein the processor highlights the road link on which the driving support is executable at the first driving support level on the display, in contrast to the road link on which the driving support is executable at the second driving support level.

* * * * *